Aug. 14, 1951  J. F. CLANCY  2,564,393
DIFFERENTIAL TRANSMISSION

Filed April 16, 1945  3 Sheets-Sheet 1

INVENTOR.
John F. Clancy
BY
Morsell & Morsell
ATTORNEYS.

Aug. 14, 1951    J. F. CLANCY    2,564,393
DIFFERENTIAL TRANSMISSION

Filed April 16, 1945    3 Sheets-Sheet 2

INVENTOR.
John F. Clancy
BY Morsell & Morsell
ATTORNEYS.

Aug. 14, 1951    J. F. CLANCY    2,564,393
DIFFERENTIAL TRANSMISSION
Filed April 16, 1945    3 Sheets-Sheet 3

Fig. 5.

INVENTOR.
John F. Clancy
BY Morsell & Morsell
ATTORNEYS.

Patented Aug. 14, 1951

2,564,393

UNITED STATES PATENT OFFICE 2,564,393

DIFFERENTIAL TRANSMISSION

John F. Clancy, East Troy, Wis.

Application April 16, 1945, Serial No. 588,632

8 Claims. (Cl. 74—686)

This invention relates to improvements in differential transmissions.

Unlike the electric motor, the torque of the gasoline engine does not adapt itself to the load. The average automobile engine develops its maximum at from 1600 to 2000 R. P. M. If the load imposed upon it is heavy enough to pull its speed down, the torque, instead of increasing, drops off, and if the speed is reduced to some 400 R. P. M. the cycle of operation breaks down and the motor stalls.

For this reason, some form of torque increasing device is necessary in all cars for starting and for heavy loads. For years the sliding gear transmission has been standard equipment for most cars and trucks, although planetary drives have been used to some extent, such as the two speed and four speed planetary transmissions.

The ideal drive for a car would be a transmission which, on starting, introduces a large gear reduction, this reduction gradually decreasing as the car starts rolling, and fading out to a direct connection with the engine as the car comes up to speed. However, all present day transmissions accomplish this in graduated arbitrary steps. In the sliding unit there is a low speed reduction of about 3 to 1, a "second" of 1½ to 1, and a "high" which is a direct connection. The automatic transmission ordinarily has four gear ratios, while heavy trucks are often equipped with multiple sliding gear transmissions having as many as twelve or more speeds. In all of these arrangements, however, there is a step by step reduction, which, in many cases, gives a decidedly bumpy start.

Automatic transmissions as heretofore used have been complicated and expensive in construction, i. e., in one typical automatic transmission there is a reversing mechanism, two planetary units each made up with a multiple plate clutch, hydraulic cylinders to operate the brake bands for the planetary units, a set of hydraulic devices to operate the clutches, an oil pump, a regulator, and a mechanical governor.

It is a general object of the present invention to provide a differential transmission which may be controlled either manually or automatically, and in which all transitions of gear ratios are performed smoothly and noiselessly, with no operating skill required.

A further and important object of the invention is to provide a differential transmission wherein an infinite number of gear ratios are obtainable and wherein there is an automatic adjustment of the torque to suit the load. In effect, a floating drive may be also obtained without the necessity of employing any shock-absorbing devices such as are used in the present day fluid type of drive.

A more specific object of the invention is to provide a differential transmission which is essentially an epicyclic gear train having a driving gear and two driven gears, together with non-reversible means for retarding the rotation of the first driven gear in proportion to the speed of rotation of the driving gear, the retarding of rotation of the first driven gear determining the relative speed of the second driven gear, and there being means for regulating the initial proportional speed of the first driven gear, and the gear train also being responsive to a reduction in load on the second driven gear for reducing the proportional speed of the first driven gear and for increasing in proportion the speed of the second driven gear.

A futher object of the invention is to provide a differential transmission as above described, wherein the non-reversible means for retarding the rotation of the first driven gear and for controlling the resultant speed includes a fractional horsepower electric motor preferably wired to the automobile generator in a manner to produce the desired results.

Other objects of the invention are to provide a differential transmission which is inexpensive to manufacture; which gives to the vehicle a fast get-away; which produces marked fuel economy in the operation of the vehicle; which permits towing in neutral or in high gear for starting in cold weather; and which can be maneuvered in practically any way which is possible with the ordinary type of sliding gear transmission.

With the above and other objects in view, the invention consists of the improved differential transmission, and all its parts and combinations, as set forth in the claims, and all equivalents thereof.

In the accompanying drawings, illustrating preferred embodiments of the invention, in which the same reference numerals designate the same parts in all of the views.

Figure 1:
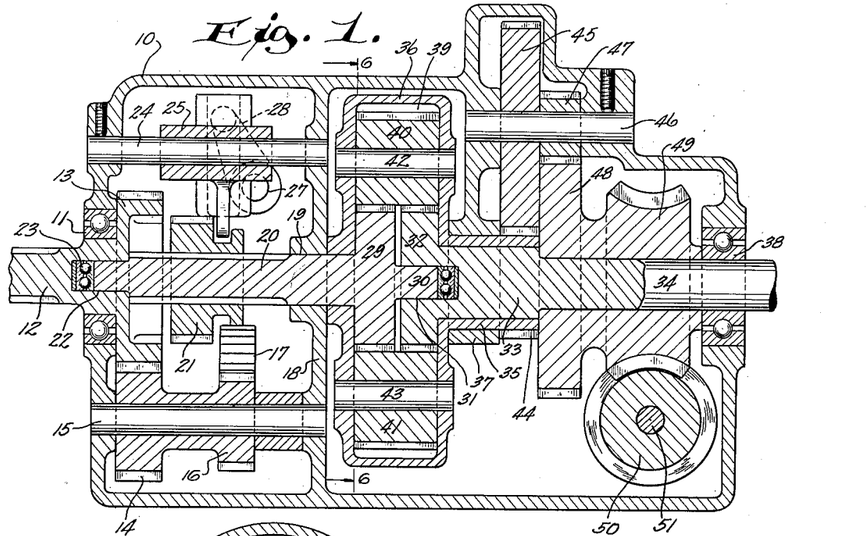
Fig. 1 is a longitudinal sectional view through the transmission casing.
Figure 2:
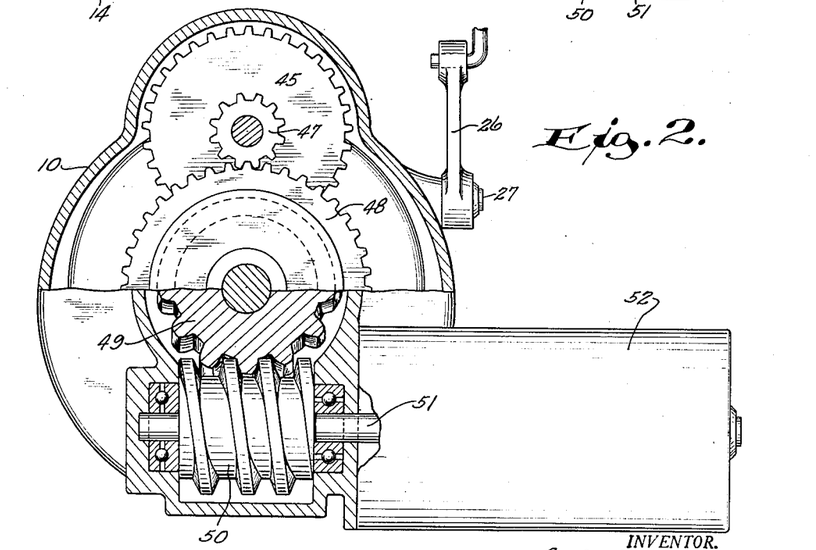
Fig. 2 is an end view of the device with parts broken away and shown in transverse section.

Referring more particularly to Figs. 1 and 2, the numeral 10 designates the transmission casing. Extending into one end of the casing through a bearing 11 is the drive shaft 12 from the automobile engine. The drive shaft has a gear 13 integral therewith or rigidly connected thereto, as is illustrated in Fig. 1. The gear 13 is located within the casing 10 and is in constant mesh with a gear 14 rotatable on a countershaft 15. Rotatable with the gear 14 around the countershaft 15 is a gear 16 which is in mesh with a reversing idler 17.

The countershaft 15 has one end supported by an end wall of the casing 10 and has its other end supported in a partition 18. Journaled in a bearing 19 formed in the partition 18 is a splined shaft 20 having a sliding pinion 21 thereon. The shaft 20 constitutes the driving shaft for the improved differential transmission. The outer end of the shaft 20 is of reduced diameter and rotates in a socket 22 formed concentrically of the drive shaft 12. There is also the usual thrust bearing 23 in the socket 22. Extending transversely between the end wall of the casing and the partition 18 above the shaft 20 is a rod 24 which supports a sleeve 25 for shifting movement. An external arm 26 (see Fig. 2) which is rigidly connected to a short shaft 27 is adapted to impart rocking movement to said shaft. Within the casing the shaft 27 has rigidly mounted thereon an arm 28, and the latter is suitably connected to the shiftable sleeve 25.

The above described construction is more or less conventional. It is apparent that, when the external arm 26 is operated in one direction to move the sliding pinion 21 to the left, referring to Fig. 1, that the pinion engages internal teeth within the gear 13 and effects a direct connection between the drive shaft 12 and shaft 20. When the parts are in the neutral position of Fig. 1 the shaft 20, of course, is not driven. When the sliding pinion 21 is moved toward the right to engage the reversing idler 17, then the shaft 20 will be driven in a reverse direction.

The inner end of the shaft 20 has a gear 29 integral therewith or rigidly connected thereto, and a reduced shaft portion 30 projects beyond the gear 29 and into a socket 31 formed concentrically of a gear 32. The gear 32 is formed integral with or rigidly connected to an enlarged portion 33 of a driven shaft 34. The enlarged portion 33 of the shaft 34 is journaled in a hub portion 35 of a rotatable gear carrier 36, and the hub 35, in turn, is journaled in a bearing 37 which is supported from the casing. The driven shaft 34 extends externally of the casing through an end wall bearing 38 and is connectable with the rear axle of the vehicle, to drive the latter.

The carrier 36 has a circular chamber 39 therein and this chamber receives the gears 29 and 32. Oppositely disposed planet pinions 40 and 41 are rotatable on shafts 42 and 43, extending transversely of the carrier 36 and the planet pinions 40 and 41 are in constant mesh with the gears 29 and 32. While the two pinions are preferred, either one or the other will suffice.

A gear reduction is interposed between the carrier 36 and a worm wheel 49. It comprises a small gear 44 rigid with the hub 35 and in mesh with a larger gear 45 on a shaft 46. Connected to the gear 45 and rotatable therewith is a smaller gear 47 which meshes with a gear 48, the latter being loose on the driven shaft 34. Rigidly connected to the gear 48 and rotatable with said gear is the worm wheel 49 which meshes with a worm 50 mounted rigidly on the drive shaft 51 of a small electric transmission motor 52.

The arrangement above described includes an epicyclic train of gears with the gear 29 constituting a driving gear, one of the planet pinions 40 or 41 mounted on the gear carrier 36 which is rotatable around the axis of the driving gear 29, and the gear 32 a driven gear which is subjected to variable loads during use of the automobile. The electric motor 52 and its controls, together with the worm 50 and worm wheel 49 constitute means acting thru the rotatable carrier 36 for controlling the speed of rotation of the planet pinion 40 or 41 to vary the relative speed of the driven gear 32.

The motor 52 may be a fractional horsepower electric motor of the same size as a standard automobile generator. The worm 50 is a low-pitch worm so that the device is not reversible. When the electric motor 52 is operating the worm can drive the worm wheel 49 but, regardless of the load on the worm wheel, the latter cannot turn the worm. By having the worm with a pitch of 15° or less, there is a coefficient of friction greater than the angularity of engagement between the teeth of the worm wheel and the worm.

*General operation of differential transmission*

For purposes of illustration, assuming that the automobile engine is rotating the shaft 12 in a clock-wise direction, referring to Fig. 1, and assuming that the sliding pinion 21 is shifted to the left to effect a direct connection between the drive shaft 12 and the shaft 20, the gear 29 within the carrier 36 will also be driven in a clock-wise direction. If there is a load on the driven shaft 34, and if the small electric motor 52 is standing still, then, because of the lock between the worm 50 and worm wheel 49 the carrier 36 will be locked against rotation and the gear 32 and driven shaft 34 will be driven clock-wise at the same speed as the engine. During this rotation the carrier 36 and worm wheel 49 exert a strong force in a counter-clock-wise direction, but rotation is nevertheless prevented because the worm wheel 49 cannot drive the worm 50 due to the low pitch employed on the worm.

With the automobile engine still turning at 3000 R. P. M., if the small electric motor 52 is operated at such a speed as to cause rotation of the carrier 36 at 3000 R. P. M. in a counter-clock-wise direction then, due to the arrangement of the planet pinions 40 and 41 which are in mesh with the gears 29 and 32, the result will be to cause the gear 32 and driven shaft 34 to stand still.

If the speed of the small electric motor 52 is reduced so that the carrier 36 rotates at 2000 R. P. M. in a counter-clock-wise direction while the automobile engine is rotating at 3000 R. P. M. in a clock-wise direction, then the gear 32 and driven shaft 34 will turn at 1000 R. P. M. in a clock-wise direction. If the speed of the small electric motor 52 is reduced so that the carrier 36 is driven at 1000 R. P. M. in a counter-clockwise direction, the speed of rotation of the gear 32 and driven shaft 34 would increase to 2000 R. P. M. If the small electric motor 52 is stopped completely then the gear 32 will again operate at 3000 R. P. M.

It is thus apparent that, because of the unique connection between the motor 52 and the gear 32 through the medium of the worm 51, worm wheel 49, reduction gearing 48, 47, 45 and 44, and planet pinions 40 and 41, any desired speed ratio can be instantly obtained by adjusting the speed of the small electric motor 52. In all of the operations heretofore described the small electric motor 52 performs no work whatsoever. It merely acts as a retarding force because the large force exerted by the carrier 36 is in a counter-clockwise direction.

The reduction gearing 44, 45, 47, and 48 between the worm wheel 49 and the carrier 36 is necessary because, if the exterior of the carrier 36 served as the worm wheel and were directly connected with the worm 50, then the small electric motor would have to be rotated at a terrific speed in order to allow the carrier 36 to rotate at 2500 or 3000 R. P. M.

Inasmuch as the small motor 52 is an ordinary automobile generator with minor modifications, and, inasmuch as the car generator is ordinarily driven at nearly twice the speed of the engine, a 6 to 1 reduction will make it possible to use a 12 tooth worm gear 49. By making the worm 50 of rather large diameter it is relatively easy to keep the pitch down to a 15 degree limit.

For the purpose of controlling the small transmission motor 52 there are many variations possible. The direct current motor 52 is capable of a very wide range of speeds and therefore has characteristics that fit in very well with the present invention. Two possible control arrangements will be described. The first, where the operation of the car is under manual control, and the second, an arrangement which permits automatic control.

*The manual control arrangement*

Figure 3:
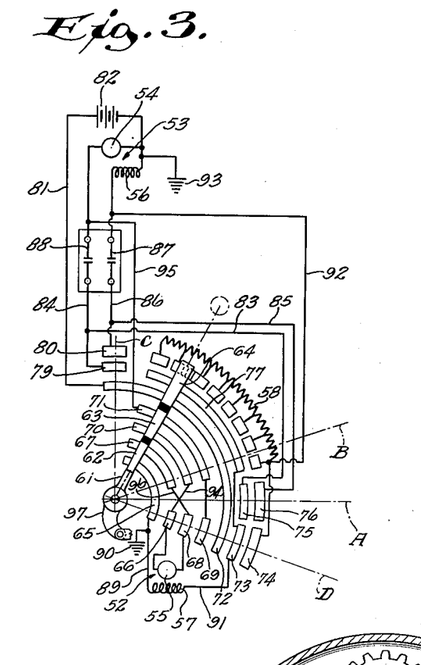
Fig. 3 is a diagrammatic view showing the wiring arrangement in conjunction with a manual control.
Figure 4:
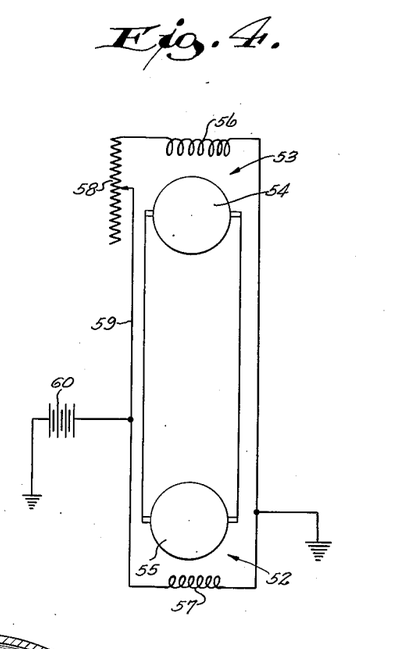
Fig. 4 is a diagrammatic view illustrating the method of wiring the car generator and transmission motor in conjunction with one another.

Referring to Figs. 3 and 4, the numeral 53 designates the usual electric generator which is driven by the engine of the automobile and used to charge the battery. In Fig. 4 the armature 54 of the automobile generator is shown as directly connected with the armature 55 of the transmission motor 52. The field 56 of the generator is wired to the field 57 of the transmission motor 52 in the manner illustrated in Fig. 4 with a rheostat 58 inserted in the line 59. The battery 60 of the automobile is also connected to the electric line 59. The transmission motor 52 is identical to the generator 53 and, therefore, if the same voltage is impressed across the fields 56 and 57, the motor 52 will run at exactly the same speed as the speed of the generator 53. Inasmuch as the generator 53 is driven directly by the engine, the motor 52 will follow every change in speed of the automobile engine and will be an almost perfect measure of its speed.

If, however, the voltage on the generator field 56 is reduced, the voltage in the armatures 54 and 55 will be reduced in proportion and therefore the speed of the transmission motor 52 will be reduced in the same proportion. If, by means of the rheostat 58 the generator field voltage is reduced to one-half of its normal value, then the speed of the transmission motor 52 will drop to one-half the speed of the generator while, if the voltage in the generator field 56 is reduced to one-fourth of its value by operation of the rheostat 58, then the speed of the transmission motor 52 will be one-fourth of the generator's speed.

Fig. 3 is an actual wiring diagram which incorporates the principles illustrated in Fig. 4 and which follows the ordinary manual operation of the automobile. A hand control lever 61, suitably located on the vehicle is formed with contact sections 62, 63 and 64 of electrical conducting material. The sections 62, 63 and 64 are separated from each other and from the frame of the car by suitable electrical insulating material. The hand lever section 62 is operable to bridge conductor segments 65 and 66 or 65 and 67. The section 63 is operable to bridge conductor segments 68 and 69 or 70 and 71. The hand lever section 64 is operable to bridge conductor segments 72, 73 and 74, or 72, 75 and 76, or 72, 77 and rheostat 58, or 72, 79 and 80. The hand control lever 61 is primarily a reversing switch combined with a field rheostat operating in the circuit to the generator field 56.

The operator of the automobile starts the automobile engine while the lever 61 is in a neutral position indicated at A in Fig. 3. While in this position, the section 64 of the hand lever is spanning the conductor segments 72, 75 and 76. Inasmuch as an electric wire 81 connects the battery 82 with the curved conductor segment 72 and inasmuch as the segment 75 is connected by the lines 83 and 84 with the generator armature 54 and the conductor segment 76 is connected by the lines 85 and 86 with the generator field 56, the generator 53 operates to charge the battery 82 in the usual manner. While the hand control lever is in the position indicated at A in Fig. 3 the automobile engine is disengaged mechanically from the transmission. The voltage regulator 87 and the battery cut-off 88 are standard equipment on all cars and operate in the usual manner when the hand lever is in the neutral position.

The driver now pushes the clutch pedal of his automobile in the usual manner and moves the hand lever 61 to the "low" speed position indicated at B in Fig. 3. The hand lever section 64 is now spanning the conductor segments 72 and 77, and is in engagement with the rheostat 58. The hand lever section 63 is spanning the conductor segments 70 and 71, and the hand lever section 62 is spanning the conductor segments 65 and 67. The conductor segment 65 is connected by the wire 89 with the ground as at 90 and with one side of the transmission motor field 57. The other side of the transmission motor field connects through the wire 91 with the segment 73, and the segment 73 is wired to the segment 77. Through the wire 92 leading from the rheostat 58, a connection is made with the field 56 of the generator. The other side of the generator field connects with the ground as at 93. One side of the transmission motor armature 55 is wired to the segment 66, and then through the wire 94, connects with the segment 70. From the segment 70 current passes through the control section 63 to the segment 71, and through wire 95 to one side of the armature 54 of the generator. The other side of the armature 54 connects with the ground at 93. The other side of the transmission motor armature 55 is connected with the short segment 68, and then through the crossed wire 96, with the segment 67. The regment 67 is connected through the contact section 62 with the segment 65 and ground 90.

It is apparent, therefore, that when the hand lever is in the "low" position B, that the transmission motor 52 immediately rotates. Inasmuch as practically none of the rheostat is cut in, the rotation is at "high" speed. This operation of the small electric transmission motor 52 at "high" speed will cause rotation of the carrier 36 in the transmission in a counter-clockwise direction at relatively high speed.

The clutch pedal on the automobile is now released while the carrier 36 in the transmission is rotating in a couter-clockwise direction. As soon as the clutch plates of the automobile engage, a powerful mechanical force will tend to rotate the carrier 36 at a still higher speed. However, inasmuch as the connection between the worm 50 and worm wheel 49 is not reversible, the speed of the transmission motor 52 will retard the speed of rotation of the carrier 36 to a predetermined value.

As the car rolls forward and picks up speed, the hand control lever 61 is moved upwardly towards the position shown in full lines in Fig. 3. This increases the resistance in the generator field 56, and reduces the maximum speed of the transmission motor 52 in accordance with the position of the hand lever 61.

When the hand control lever is moved to the "high" position C, the electrical connections are the same as they were in the neutral position A and the transmission motor 52 is cut off.

The generator is then connected with the battery 82 in the usual manner. Inasmuch as the transmission motor 52 is now out of operation, the worm 50 locks the carrier 36 against rotation, and through the planet pinions 40 and 41 the gear 32 is driven at the same speed as the gear 29 and in the same direction.

To illustrate certain extreme conditions of use, it is assumed that the car is being started on a down-grade and that the driver has proceeded as heretofore explained. As soon as the clutch is engaged, the car starts rolling and almost instantly the speed of the driven gear 32 catches up with the speed of rotation of the driving gear 29. This immediately causes the carrier 36 to slow down and stop, because it is no longer urged in a counterclockwise direction and the small electric transmission motor is not powerful enough to turn the carrier by itself in this condition. There is, in effect, a direct connection between the gears 29 and 32. In other words, the car is almost instantly put into high gear, but under down-hill conditions, this is exactly what is desired. When there is no load there is no need for a gear reduction, and the present invention automatically adjusts itself to the load. It might be suggested that the transmission motor 52 would become overloaded when it is allowed to stall when connected to the generator. This condition, however, does no harm whatsoever as it is only momentary, and the maximum output of the car generator is only about 35 amperes with full field voltage.

To illustrate the operation of the transmission in another extreme condition encountered during the use of an automobile, let it be assumed the car is started on a down-grade, but immediately after the car has caught up with the engine speed the grade changes to a steep up-grade. The small transmission motor 52 will start as before described, run at high speed, and then stall on the down-grade. With the hand control lever 61 still in low, the transmission motor 52 will as the car starts on the up-grade immediately step up to high speed as the load is increased, and will provide the necessary gear reduction for this hard pull. It is apparent, therefore, that while the motor 52 at all times limits the maximum speed of the carrier 36, this speed will automatically be decreased at any time that the speed of the car approaches the speed of the engine.

When the control 61 is shifted to the reverse position D of Fig. 3, the connections are the same as in the "low" speed position B except that the crossed wires 94 and 96 are cut out of the circuit so that the armature connections are reversed to reverse the direction of rotation of the transmission motor 52. In reverse, the generator field resistance is rather low so that the speed of the transmission motor is high and provides a rather large gear reduction.

The hand control lever may serve to oscillate an arm 97 (Fig. 3), and this arm may be suitably connected with the shifting arm 26 of Fig. 2. The mechanical connections will be such that, when the hand control lever 61 is in reverse position, the sliding pinion 21 of Fig. 1 will be shifted into engagement with the reverse idler 17. When the hand control lever 61 is in the neutral position, the connections between the arm 97 of the hand control and the shifting arm 26 will be such that the sliding pinion 21 will be in the neutral position shown in Fig. 1. When the hand control lever 61 is in any of the forward speed positions, the sliding pinion 21 will be shifted to the left, referring to Fig. 1, to connect with the gear 13.

The control system above outlined is along the lines of an ordinary manual control. For truck or bus application this arrangement would be the most satisfactory. For passenger cars, however, the automatic arrangement to be hereinafter described will be desirable.

Automatic control

The automatic control consists of two control switches, each somewhat similar to the one illustrated in Fig. 3, and each including a reversing switch and a generator field rheostat. In addition, there are interlocking connections between the two switches to prevent the operation of one from interfering with the operation of the other.

Figure 5:
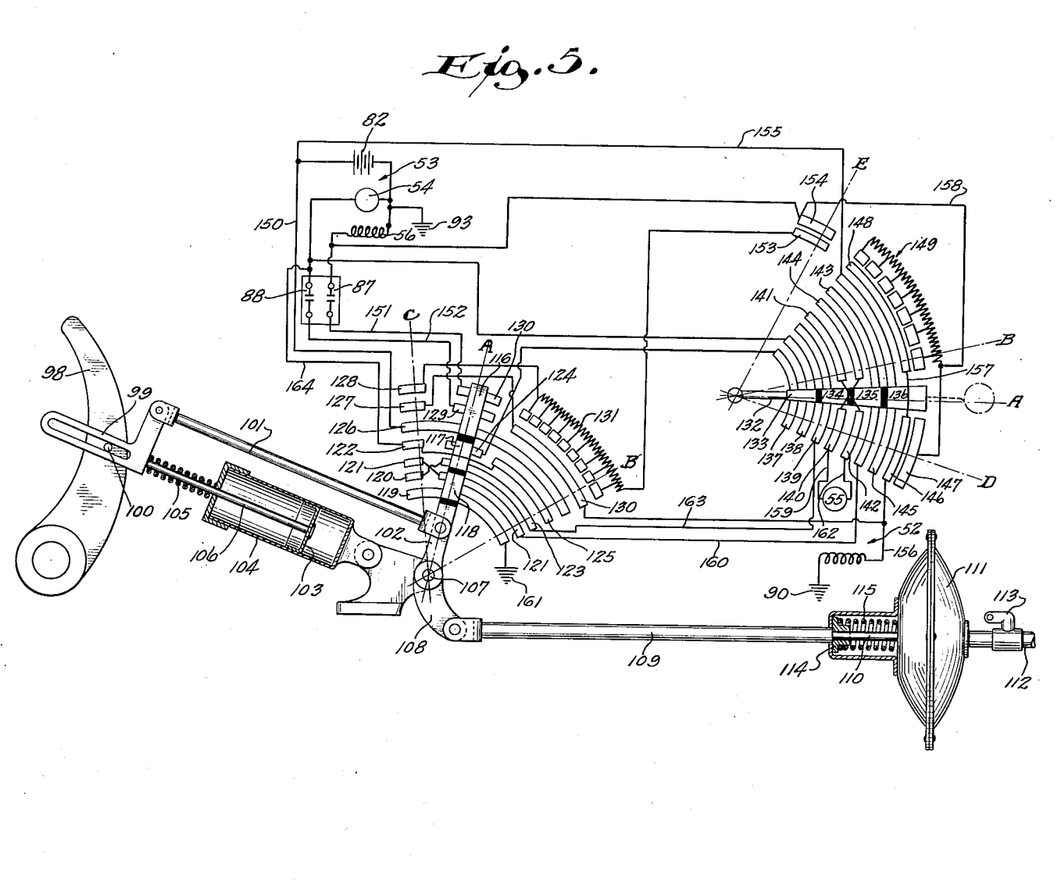
Fig. 5 is a partially diagrammatic view illustrating an automatic control.
Figure 6:
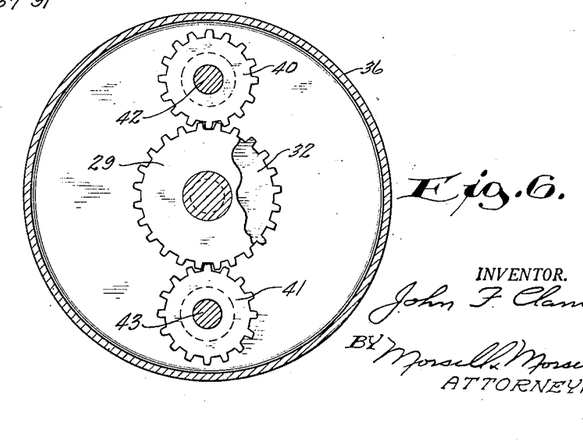
Fig. 6 is a transverse sectional view taken on line 6—6 of Fig. 1.

Referring to Fig. 5, the vehicle clutch pedal 98 operates through a slotted arm 99 and pin 100 to cause inward movement of a link 101 and movement of a clutch controlled switch arm 102 from the neutral position A to the "low" speed position B. During this movement, the piston 103 of a dash-pot 104 is depressed, and also a spring 105 surrounding the dash-pot piston rod 106 is compressed. The spring 105 serves to return the clutch pedal to its original position but such return movement is retarded by the dash-pot action.

The inner-end of the switch arm 102 is rigidly connected with a pivot rod 107 and also rigidly connected to the pivot rod is a curved arm 108 which is connected by a rod 109 with a plunger 110 connected to the diaphragm of a vacuum operated control 111. A vacuum line 112 from the automobile engine manifold connects with the chamber on one side of the diaphragm of the control 111. There is a shut-off valve 113 in the vacuum line 112. When the valve 113 is open, and when the vacuum is operating, the diaphragm within the control 111 will flex toward the right (in Fig. 5) producing a pull to the right on the plunger 110 which is transmitted to a collar 114 rigidly connected thereto, and also to the rod 109. The pull on the collar 114 acts to compress a spring 115. This will serve to move the switch arm 102 from the position A to the position C for a purpose to be hereinafter described. Inasmuch as the spring 115 is considerably heavier than the spring 105 adjacent the dash-pot, the latter spring, upon release of the clutch pedal, will bring the switch arm 102 back to the position A only. It is only when the vacuum control 111 is operating that the switch arm 102 is moved to the position C.

The clutch pedal operated switch arm 102 includes contact sections 116, 117 and 118. Section 118 is adapted to bridge conductor segments 119 and 120, or 119 and 121. The contact section 117 is adapted to bridge conductor segments 121 and 122, or 123 and 124, or 123 and 125. The contact sections 116 is adapted to bridge conductor segments 126, 127 and 128, or segments 126, 129 and 130, or segments 126, 130 and rheostat 131. The contact sections 116, 117 and 118 are separated from each other by suitable electrical insulating material.

Some form of hand control is necessary on any car even with automatic operation in order to select between neutral, reverse and low, the manual control of low being necessary for certain purposes, such as parking. The manual control switch lever 132 contains electric contact sections 133, 134, 135, and 136, all insulated from each other. The section 133 is adapted to bridge conductor segments 137 and 138. The contact section 134 is adapted to bridge conductor segments 139 and 140, or conductor segments 139 and 141. The contact section 135 is adapted to bridge conductor segments 142 and 143, or 143 and 144. The contact section 136 is adapted to bridge conductor segments 145, 146 and 147, or 145, 148 and rheostat 149.

In operation of the device with the automatic control, if the driver wishes to move the car ahead at low speed, he starts his engine and leaves the hand lever 132 in the neutral position A of Fig. 5. The clutch pedal switch arm 102 is also in the position of A of Fig. 5, and in this position, the battery 82 is connected to the conductor segment 126 by the wire 150. The conductor segment 126 is bridged by the contact section 116 which also contacts the segments 129 and 130. The segment 130 is connected by the line 151 with one side of the generator field 56 and the conductor segment 129 is connected by the line 152 with the generator armature 54. Thus, the generator is being operated to charge the battery but the transmission motor 52 is shut off.

When the clutch pedal 98 is pushed inwardly, the clutch pedal operated switch arm 102 is moved from position A to position B. At the same time the hand lever 132 may be moved to the "low" position B. When the clutch operated switch arm 102 is in the position B, and when the hand switch lever 132 is in its position B, the control is through the hand lever because the circuit through the clutch control switch is broken as there is no bridging of the contact segments 153 and 154 which control the automatic operation.

Referring to the hand control switch in the position B, the switch section 136 is bridging conductor segments 145, 148, and the rheostat 149. The battery 82 is connected into the circuit through the line 155 which connects with the conductor segment 145. One side of the field in connection with the transmission motor 52 is connected to the ground as at 90. The other side of the field is connected by a wire 156, conductor segment 146, wire 157 and conductor segment 148 with the contact section 136. This section also makes contact with the rheostat and the latter is connected by the line 158 with one side of the generator field 56. The armature 55 of the transmission motor 52 has one side connected by a wire 159 with the conductor segment 140 and from the latter segment through the crossing wire there is a connection with the conductor segment 144. Through the contact section 135, the current passes to the conductor segment 143 and from the latter, current passes through the wire 160, conductor segment 121 of the clutch switch, clutch arm section 118, conductor segment 119 to the ground, as at 161. The other side of the transmission motor armature 55 is connected by a wire 162 with contact segment 142 and through one of the crossed wires with the conductor segment 141. Conductor segment 141 is connected by contact section 134 with conductor segment 139. The latter is connected by the wire 163 with conductor segment 123. Inasmuch as the clutch pedal operated switch 102 is in the B position, with the contact section 117 bridging conductor segments 123 and 125, and, inasmuch as segment 125 is connected by wire with segment 122, the circuit is complete through wire 164 with one side of the generator armature 54. The other side of the generator armature connects with the ground as at 93. It is thus apparent that the transmission motor 52 will now operate at "high" speed because no great amount of the rheostat 149 is cut in as yet.

As the clutch is released, the transmission motor 52 will continue to run at "high" speed because it is under control of the hand lever 132. To accelerate the speed, the operator moves the hand lever upwardly on the rheostat from the position B to slow down the operation of the transmission motor 52. When the hand lever 132 is pushed to the automatic position E, then the automatic contacts 153 and 154 are bridged and the device is under the control of the clutch operated switch. In the meantime, the released clutch has returned the clutch switch arm 102 to its A position. The transmission motor 52 is now shut off and the car is being driven in "high."

If the automobile arrives at a stop light, the car is stopped by pushing in the clutch and the brake in the usual manner, leaving the manual switch at the automatic position E. With the clutch pedal down while the car is standing, the small motor will run at "high" speed because the clutch switch arm is in the position B wherein very little of the clutch rheostat 130 is cut in.

On starting up, it is merely necessary to release the clutch pedal. Due to the dash-pot retarded return of the clutch pedal, the car will start out in "low," and the clutch control switch arm 102 will gradually be moved toward the left from its B position to progressively slow down the transmission motor 52. Ultimately, the clutch control switch arm 102 will be returned to the A position. This shuts off the transmission motor 52, and gives a direct connected condition between the engine and the rear axle.

Reversing is accomplished through the hand control 132 by moving it to the position D of Fig. 3. Whenever there is no necessity for manual control, the hand lever may be immediately pushed to the automatic position E, and the whole operation will be under the control of the clutch pedal operated switch and will be automatic.

*Overdrive*

Referring again to Fig. 1, if the gear 29 is rotating at 3000 R. P. M. in a clock-wise direction and the carrier 36 is rotated in the opposite direction by the transmission motor and at the same speed, the gear 32 will stand still. If the speed of rotation of the carrier 36 is reduced to 1500 R. P. M., then the gear 32 will be rotated at 1500 R. P. M. in a clock-wise direction. If the carrier 36 is held against rotation, the gear 32 will be driven at 3000 R. P. M. However, if, when driving the automobile, the momentum of the car should tend to cause the gear 32 to rotate at 3500 R. P. M. while the gear 29 is being rotated by the engine at only 3000 R. P. M., then the carrier 36 will tend to be driven in a clock-wise direction at 500 R. P. M. In other words, the direction of rotation of the carrier 36 will tend to reverse at any time that there is an overhauling condition where the car tends to drive the motor. Actual reversal of the carrier by this overhauling force is prevented by the worm gearing described hereinbefore.

Attempts which have heretofore been made with free-wheeling to obtain the advantage of a coasting effect, have been objectionable because they have been rather unsafe. The motor does not exert a retarding effect during free-wheeling and this is dangerous in an emergency. Attempts have been made to provide an overdrive arrangement wherein the gear ratio in the connection between the engine and the rear axle is stepped up to about 20% above a direct connection. The operation has been controlled by a mechanical governor.

With the present invention the simplest method of controlling a geared-up arrangement would be to reverse the direction of rotation of the transmission motor 52 for "high" speed settings, and set the generator field resistance to a point to limit the transmission motor speed to about 20% of that of the engine. With such an arrangement, however, there would be a stalled motor 52 connected to the generator a large part of the time due to the fact that the small electric motor is strong enough to rotate the carrier in a clockwise direction only when there is an overhauling condition present, and there would be no means of charging the battery.

However, by making use of the vacuum condition in the intake manifold of the automobile engine a simple form of over-drive may be combined with the present invention. One of the most obvious indications of an over-hauling condition in a motor car is the marked increase in the vacuum at the time over-hauling occurs. Accordingly, when such vacuum condition occurs the diaphragm in the vacuum control 111 will be pulled toward the right, referring to Fig. 5, and will cause a pull on the rod 109, against the tension of the spring 115, to move the clutch operated switch arm 102 to the C position, holding it in this position as long as the high vacuum condition exists. When in this position, the transmission motor 52 has its direction reversed and it is allowed to run at up to 20% of the engine speed. Thus, an effective over-drive arrangement is provided. By turning the valve 113 to shut-off position, the over-drive may be used optionally as desired.

Although the vacuum valve 111 is used primarily to control the over-drive, it also serves on ordinary starts if, while accelerating with the hand lever in the automatic position E, the car gains rapidly in speed. This over-hauling stalls the transmission motor 52, but the vacuum pull will speed up the dash-pot action and pull the clutch switch from its position B to its position A almost instantly.

While the generator is cut off from the battery part of the time during use of the over-drive, this will not seriously affect the battery charging because the charging rate of all generators is adjustable, and this rate can be increased to make up for the time lost while the car is overhauling the motor during operation of the over-drive.

It is apparent from the above that the present invention provides a transmission which has all the desirable features of both the manual and automatic control and, in addition, many advantages over present day devices. All transitions of gear ratios are made smoothly and noiselessly with an infinite number of gear ratios obtainable, and no skill is necessary in the operation. There is an automatic adjustment of the torque to suit the load. By use of the over-drive feature a real floating drive is obtained with very simple mechanism compared to the mechanism now used. The invention provides for a very fast get-away and for marked fuel economy.

Various different control circuits are possible with the present device and those heretofore described are merely illustrative of preferred embodiments. Any type of timing element may be used to retard the return movement of the clutch pedal, the dash-pot illustrated, however, being well suited for this purpose.

Various other changes and modifications may be made without departing from the spirit of the invention and all of such changes are contemplated as may come within the scope of the claims.

What I claim is:

1. In a differential transmission interposed between the drive shaft from a source of relatively high horsepower and a shaft to be driven, a driving gear attached to said drive shaft, a planet pinion in engagement with said driving gear, a driven gear in engagement with said planet pinion, a rotatable carrier for said planet pinion coaxial with said driving gear and said driven gear, a low pitch worm wheel connected to said carrier, a low pitch worm coacting with said wormwheel, a relatively small electric generator driven by said source of power, an electric motor of relatively small horsepower for driving said low pitch worm, said motor having sufficient power to rotate the worm only when the carrier is being urged in the same direction of rotation as it would be rotated by said worm if the motor had greater power, an electrical circuit for delivering current from said generator to said small horsepower motor in a manner to cause said small motor to run at substantially the same speed as the generator, and means for selectively changing said motor speed to a speed different from the speed of said generator, said motor having insufficient power to alone cause rotation of said carrier.

2. In a differential transmission interposed between the drive shaft from a source of relatively high horsepower and a shaft to be driven, a driving gear attached to said drive shaft, a planet pinion in engagement with said driving gear, a driven gear in engagement with said planet pinion, a rotatable carrier for said planet pinion coaxial with said driving gear and said driven gear, a low pitch wormwheel connected to said carrier, a low pitch worm coacting with said wormwheel, a relatively small direct current electric generator driven by said source of power, a direct current electric motor of relatively small horsepower for driving said low pitch worm, said motor having sufficient power to rotate the worm only when the carrier is being urged in the same direction of rotation as it would be rotated by said worm if the motor had greater power, an electrical circuit connecting the armature of said generator and said motor in parallel and connecting the fields of said generator and said motor in parallel, whereby said small horsepower motor tends to run at substantially the same speed as the generator, and means for selectively changing said motor speed to a speed different from the speed of said generator, said motor having insufficient power to alone cause rotation of said carrier.

3. In a differential transmission interposed between the drive shaft from a source of relatively high horsepower and a shaft to be driven, a driving gear attached to said drive shaft, a planet pinion in engagement with said driving gear, a driven gear in engagement with said planet pinion, a rotatable carrier for said planet pinion coaxial with said driving gear and said driven gear, a low pitch wormwheel connected to said carrier, a low pitch worm coacting with said wormwheel, a relatively small electric generator driven by said source of power, a reversible electric motor of relatively small horsepower for driving said low pitch worm, said motor having sufficient power to rotate the worm only when the carrier is being urged in the same direction of rotation as it would be rotated by said worm if the motor had greater power, an electrical circuit for delivering current from said generator to said small horsepower motor in a manner to cause said small motor to run at substantially the same speed as the generator, means for selectively changing said speed to a speed different from the speed of said generator, and means for selectively varying the direction of rotation of said small motor, said motor having insufficient power to alone cause rotation of said carrier.

4. In a differential transmission interposed between the drive shaft from a source of relatively high horsepower and a shaft to be driven, a driving gear attached to said drive shaft, a planet pinion in engagement with said driving gear, a driven gear in engagement with said planet pinion, a rotatable carrier for said planet pinion coaxial with said driving gear and said driven gear, a low pitch wormwheel connected to said carrier, a low pitch worm coacting with said wormwheel, a relatively small electric generator driven by said source of power, reversible electric motor of relatively small horsepower for driving said low pitch worm, said motor having sufficient power to rotate the worm only when the carrier is being urged in the same direction of rotation as it would be rotated by said worm if the motor had greater power, an electrical circuit for delivering current from said generator to said small horsepower motor in a manner to cause said small motor to run at substantially the same speed as the generator, a rheostat in said circuit for changing said motor speed to a selected speed different from the speed of said generator, a reversing switch in said circuit, and means responsive to the load on said source of power for actuating said reversing switch.

5. In a differential transmission interposed between the drive shaft from a source of relatively high horsepower and a shaft to be driven, a driving gear attached to said drive shaft, a planet pinion in engagement with said driving gear, a driven gear in engagement with said planet pinion, a rotatable carrier for said planet pinion coaxial with said driving gear and said driven gear, a low pitch wormwheel connected to said carrier, a low pitch worm coacting with said wormwheel, a relatively small electric generator driven by said source of power, an electric motor of relatively small horsepower for driving said low pitch worm, an electrical circuit for delivering current from said generator to said small horsepower motor, and a clutch pedal operated switch in said circuit for controlling the speed of said small motor, said switch including a timing device to regulate its operation.

6. In a differential transmission interposed between the drive shaft from a source of relatively high horsepower and a shaft to be driven, a driving gear attached to said drive shaft, a planet pinion in engagement with said driving gear, a driven gear in engagement with said planet pinion, a rotatable carrier for said planet pinion coaxial with said driving gear and said driven gear, a low pitch wormwheel connected to said carrier, a low pitch worm coacting with said wormwheel, a relatively small electric generator driven by said source of power, a reversible electric motor of relatively small horsepower for driving said low pitch worm, an electrical circuit for delivering current from said generator to said small horsepower motor, a manually operated switch in said circuit for controlling the direction of rotation and the speed of said small motor, and a clutch pedal operated switch in said circuit for alternatively controlling the speed of said small motor, said switch including a timing element to regulate its operation.

7. In a differential transmission interposed between the drive shaft from a source of relatively high horsepower and a shaft to be driven, a driving gear attached to said drive shaft, a planet pinion in engagement with said driving gear, a driven gear in engagement with said planet pinion, a rotatable carrier for said planet pinion coaxial with said driving gear and said driven gear, a low pitch wormwheel connected to said carrier, a low pitch worm coacting with said wormwheel, a relatively small electric generator driven by said source of power, an electric motor of relatively small horsepower for driving said low pitch worm, an electrical circuit for delivering current from said generator to said small horsepower motor, means including a rheostat in said circuit for controlling the direction of rotation and speed of said small motor, clutch pedal operated means for operating said rheostat during the return movement of the clutch pedal after depression, and means for retarding said return movement of the clutch pedal.

8. In a differential transmission interposed between the drive shaft from an automobile engine and a shaft to be driven, a driving gear attached to said drive shaft, a planet pinion in engagement with said driving gear, a driven gear in engagement with said planet pinion, a rotatable carrier for said planet pinion coaxial with said driving gear and said driven gear, a low pitch wormwheel connected to said carrier, a low pitch worm coacting with said wormwheel, a relatively small electric generator driven by said automobile engine, an electric motor of relatively small horsepower for driving said low pitch worm, an electrical circuit for delivering current from said generator to said small horsepower motor, mechanism including a reversing switch and a rheostat in said circuit for controlling the direction of rotation and speed of said small motor, a vacuum line connectable with the intake manifold of the automobile engine, and means including a diaphragm connected to said reversing switch actuated by an increase in vacuum in said line for automatically reversing the direction of rotation of the small motor to provide an overdrive for the duration of said increase in vacuum.

JOHN F. CLANCY.

REFERENCES CITED

The following references are of record in the file of this patent:

UNITED STATES PATENTS

| Number | Name | Date |
| --- | --- | --- |
| 1,191,290 | Dillon et al. | July 18, 1916 |
| 1,442,908 | Ripley | Jan. 23, 1923 |
| 1,628,606 | Koehnel | May 10, 1927 |
| 1,706,276 | Zweigbergk | Mar. 19, 1929 |
| 1,723,231 | Ellsworth | Aug. 6, 1929 |
| 1,782,001 | Crichton | Nov. 18, 1930 |
| 1,837,803 | Weston | Dec. 22, 1931 |
| 1,984,830 | Higley | Dec. 18, 1934 |
| 1,992,210 | Higley | Feb. 26, 1935 |
| 2,000,465 | Higley | May 7, 1935 |
| 2,019,424 | Low | Oct. 29, 1935 |
| 2,045,197 | Neuland | June 23, 1936 |